Figure 15:
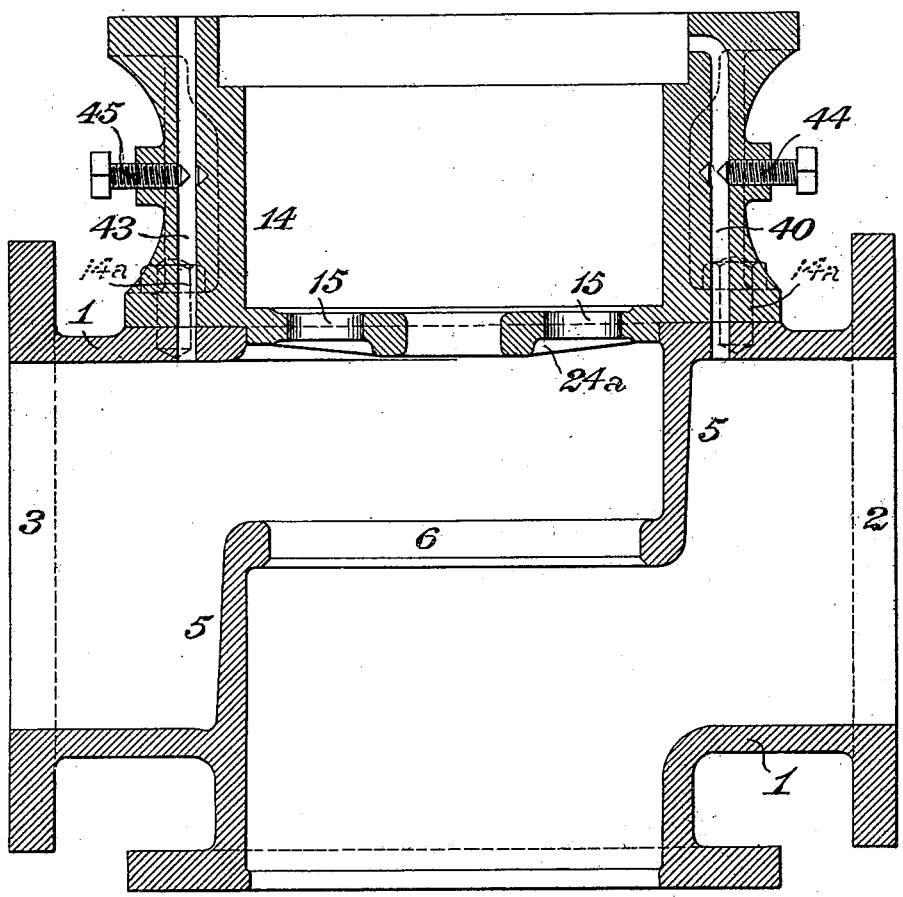

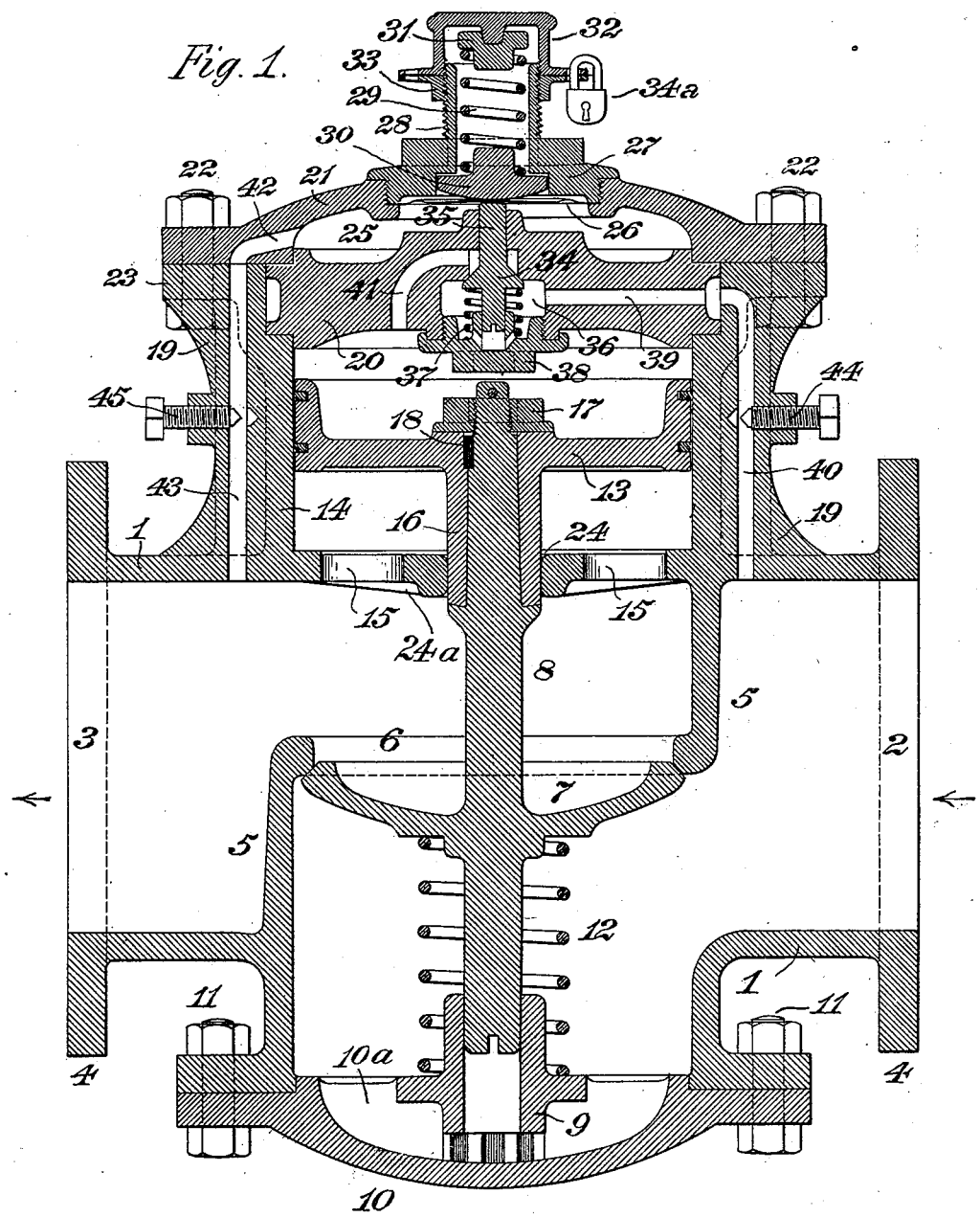

No. 648,591. Patented May 1, 1900.
J. P. METZGER.
PRESSURE REGULATOR.
(Application filed Nov. 24, 1899.)
(No Model.) 6 Sheets—Sheet 2.
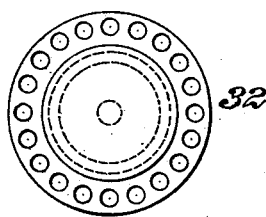
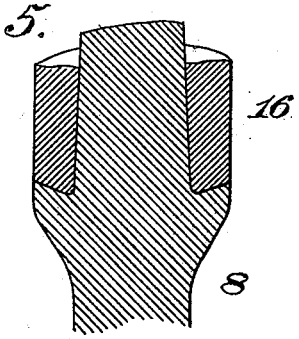
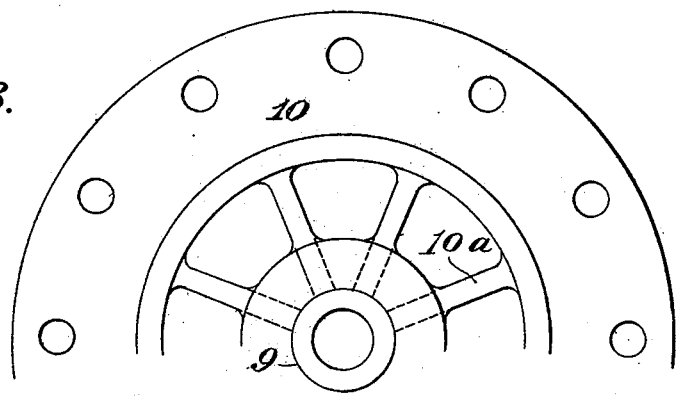
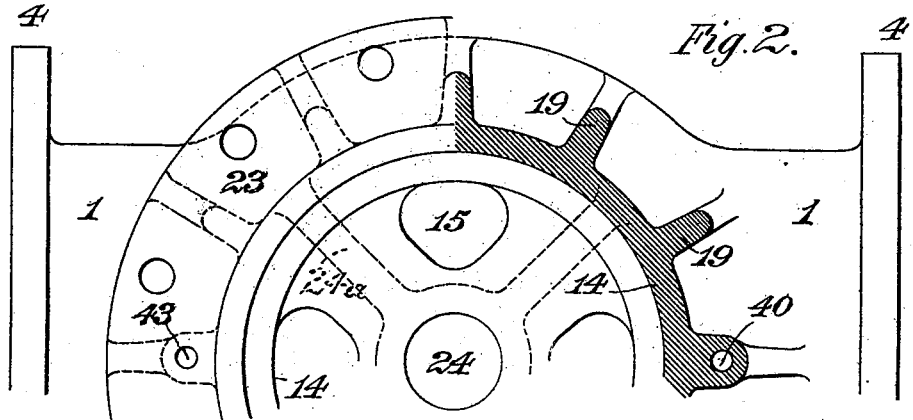
Witnesses Inventor

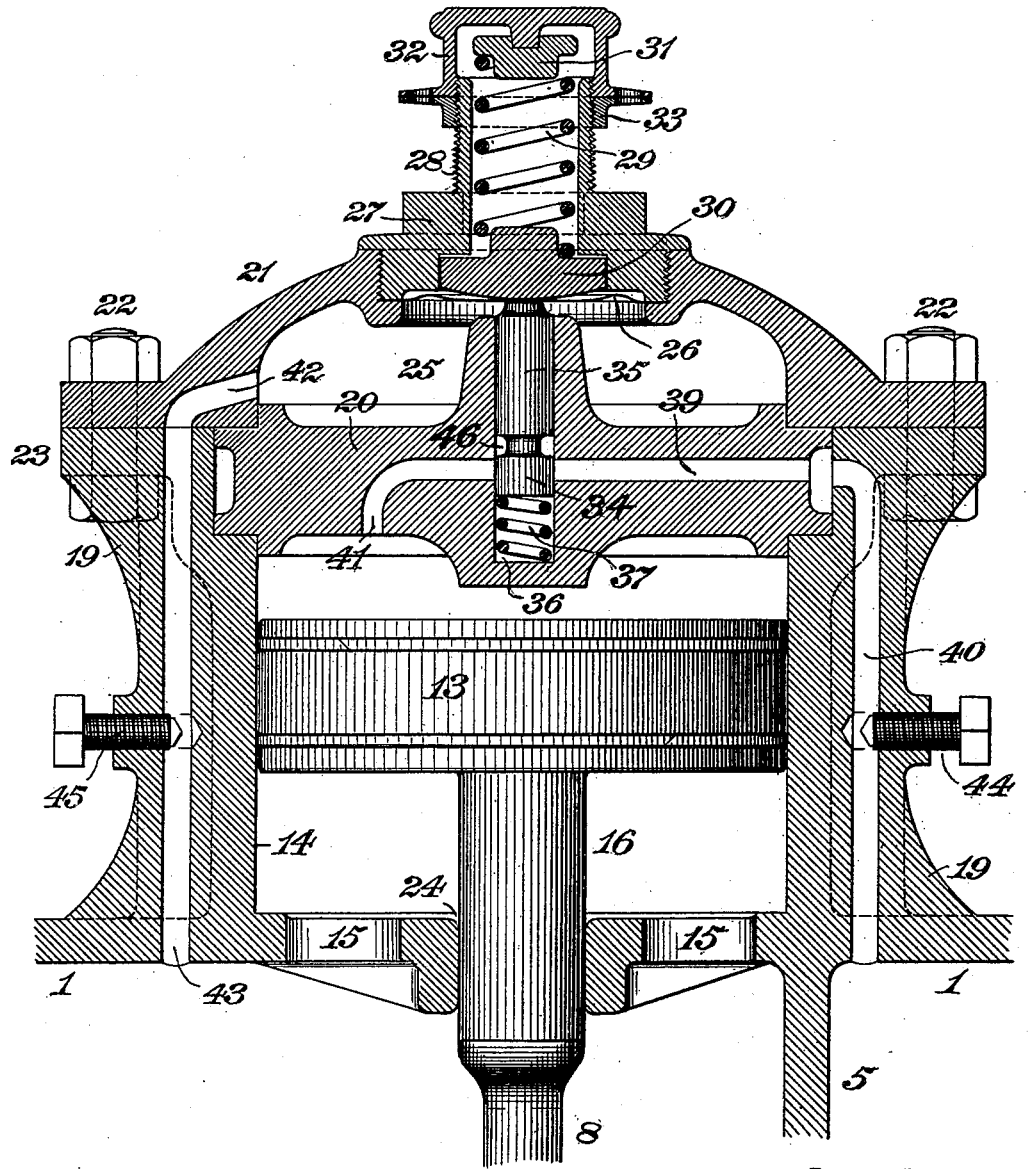

No. 648,591. Patented May 1, 1900.
J. P. METZGER.
PRESSURE REGULATOR.
(Application filed Nov. 24, 1899.)
(No Model.) 6 Sheets—Sheet 4.
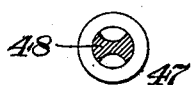
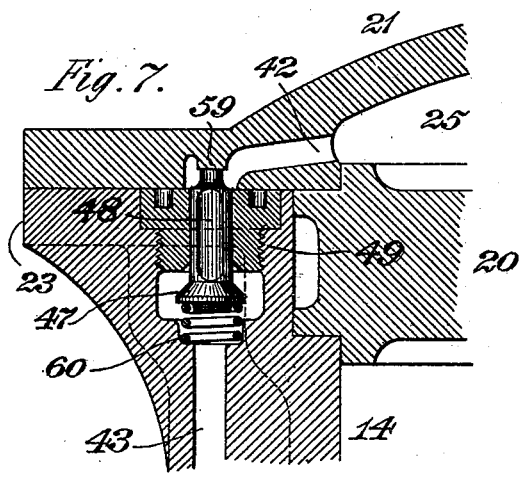
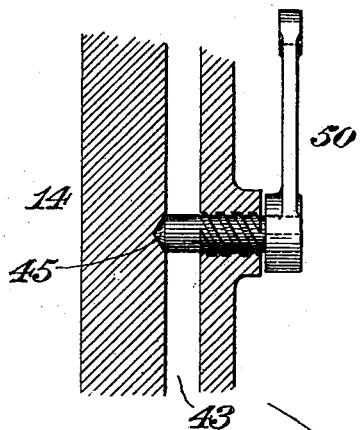
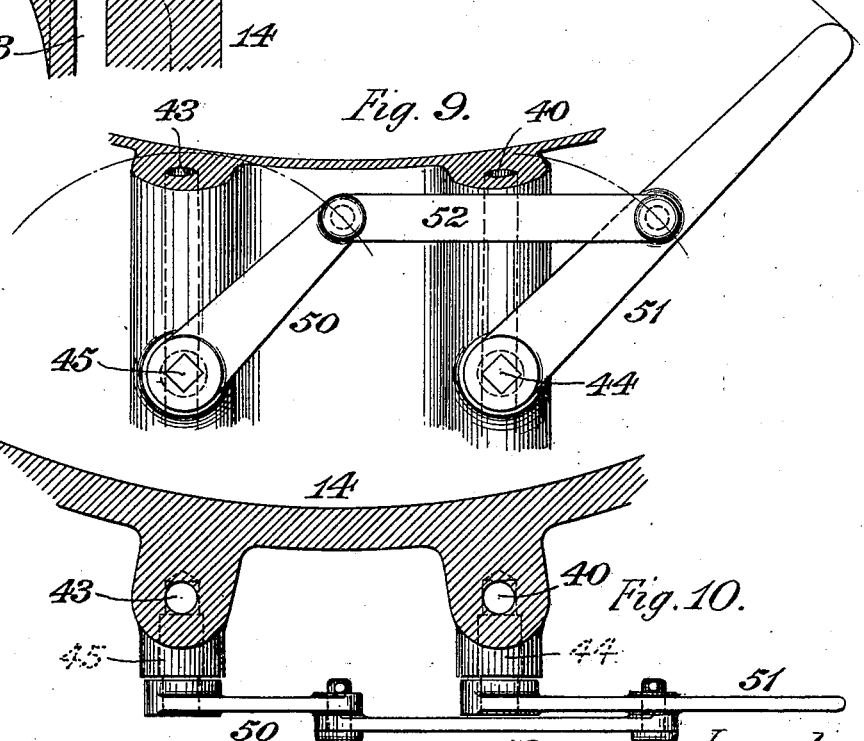

No. 648,591. Patented May 1, 1900.
J. P. METZGER.
PRESSURE REGULATOR.
(Application filed Nov. 24, 1899.)
(No Model.) 6 Sheets—Sheet 5.
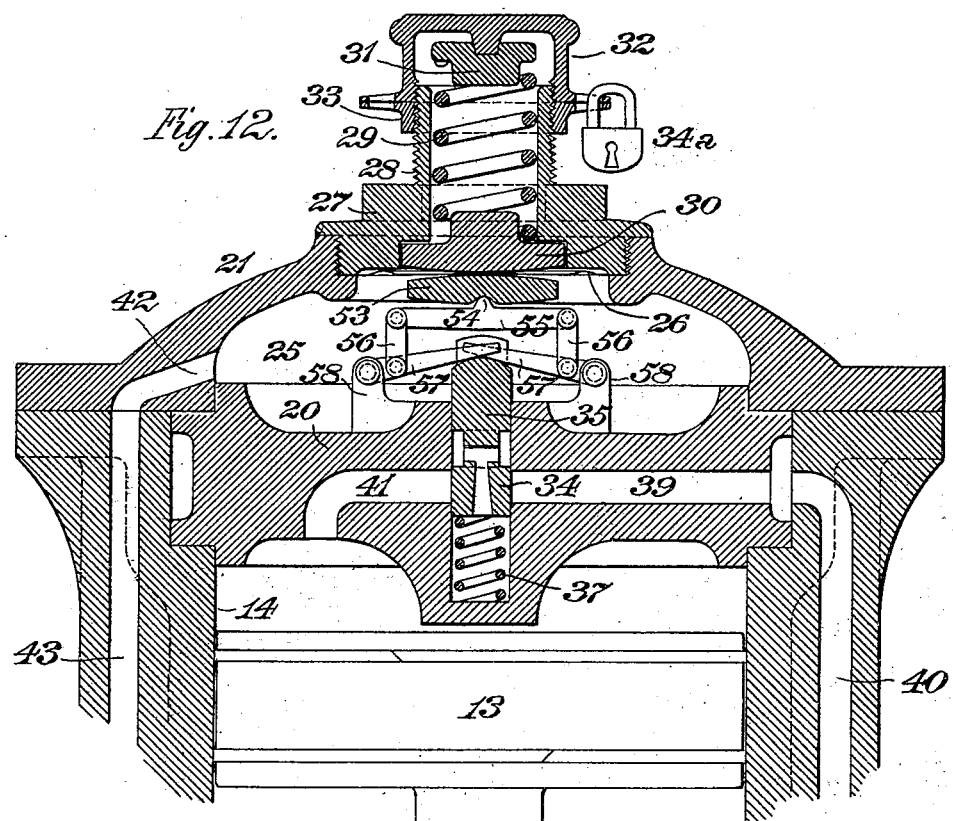
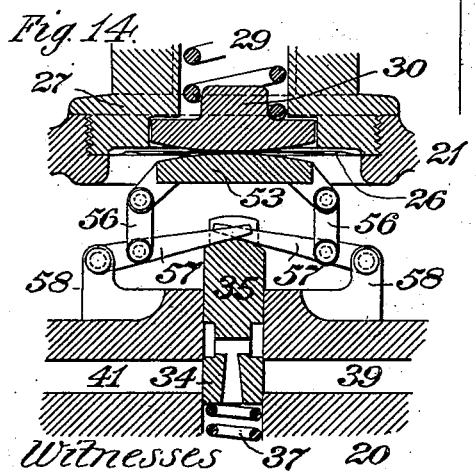
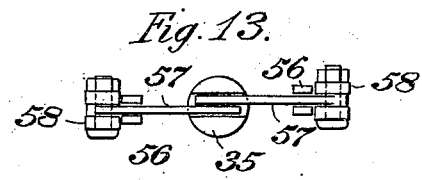
Witnesses Inventor
Jules P. Metzger No. 648,591. J. P. METZGER. Patented May 1, 1900.
PRESSURE REGULATOR.
(Application filed Nov. 24, 1899.)
(No Model.) 6 Sheets—Sheet 6.

UNITED STATES PATENT OFFICE.

JULES P. METZGER, OF NEW YORK, N. Y., ASSIGNOR TO JOHN S. LESLIE, OF PATERSON, NEW JERSEY.

PRESSURE-REGULATOR.

SPECIFICATION forming part of Letters Patent No. 648,591, dated May 1, 1900.

Application filed November 24, 1899. Serial No. 738,125. (No model.)

*To all whom it may concern:*

Be it known that I, JULES P. METZGER, of the borough of Manhattan, in the city and State of New York, have invented a certain new and useful Improvement in Pressure-Regulators, of which improvement the following is a specification.

My invention relates to appliances of the class comprising so-called "pressure-regulators" and "reducing-valves," in which a main valve which regulates the supply of fluid from an inlet to an outlet passage is actuated as to its opening movements by a piston which is operated by fluid from the inlet-passage, the supply and exhaust of which to and from the actuating-piston are controlled by a secondary or controlling valve, the movements of which are in turn regulated by a movable abutment subjected on one side to pressure from the outlet-passage and on the other side to the pressure of a spring or weight.

The object of my invention is to provide a pressure-regulator of the type above generally specified which shall be effective and reliable in operation under all variations of pressure, whether intermittent or continuous, on either side of the regulating-valve; in which the same proportions of diaphragm and adjusting-spring may be employed regardless of difference in diameter of the regulating-valve or of the initial and reduced pressures for which it is desired to operate; in which the actuating members of the regulating-valve may be inspected or repaired without interfering with or shutting off the main-line pipes; and in which the objections heretofore experienced due to unequal expansion shall be effectually obviated.

The improvement claimed is hereinafter fully set forth.

In the accompanying drawings, Figure 1 is a longitudinal central section through a pressure-regulator, illustrating an embodiment of my invention; Fig. 2, a view, partly in plan and partly in horizontal section, through the piston-chamber, showing the shell or casing of the appliance; Fig. 3, a partial plan view of the bottom cap or cover; Fig. 4, a plan view of the adjusting-cap; Fig. 5, a section, on an enlarged scale, through the joint of the piston-sleeve and regulating-valve stem; Fig. 6, a longitudinal central section through the piston-chamber and upper cap, showing a modified form of controlling-valve; Fig. 7, a partial section through the outlet-port and cap of the casing, showing an automatic check-valve; Fig. 8, a transverse section through the stem of the check-valve; Fig. 9, a side view in elevation of a device for simultaneously actuating the valves controlling the inlet and outlet side ports; Fig. 10, a plan view of the same; Fig. 11, a partial section through one of the ports with the valve and its lever-arm in elevation; Fig. 12, a section through the piston-chamber, side ports, and upper cap, showing means for increasing the traverse of the controlling-valve; Fig. 13, a plan view of the controlling-valve of Fig. 12 and the levers bearing thereon; Fig. 14, a sectional view illustrating a modification of the valve-actuating mechanism of Fig. 12, and Fig. 15 a section through a shell or casing and a separate piston-chamber bolted thereto.

In the operation of pressure-regulators of the constructions heretofore employed when of comparatively-large size and used with steam of high pressure much difficulty is frequently experienced by reason of the piston sticking or binding in the cylinder, thereby rendering the working of the appliance erratic and unreliable and in some cases causing it to fail entirely. Various expedients have been resorted to for the purpose of overcoming this difficulty, as cylinder-liners of different material or liners exposed on both sides to the fluid-pressure; but these have not only failed to be fully satisfactory, but have also in some instances even aggravated the objection which they were designed to overcome. When used with steam of comparatively high pressure, the stresses upon the metal of the regulator casing or shell, as well as the expansion of the metal, are proportionately increased, and the inner and outer sides of the shell being exposed to different temperatures a sudden release of pressure or the institution of widely-different initial and outlet pressures, coupled with a sudden demand for a large volume of fluid, (as is often the case in practice when the appliance controls the supply of several apparatuses which are not constantly in operation,) will cause the casing or shell in a manner to pulsate, the cylinder assuming an elliptical form in the line of the flange attachments, flattening at right angles thereto, and the walls of the cylinder do not remain parallel, moving differently in accordance with more or less stressed constructions—as, for example, in designs in which screwing strains the parts. In large pressure-regulators of the type to which the invention relates it is also found that binding of the piston in the cylinder results from the tendency to buckling, which results from the absence of a rigid connection between the piston and the regulating-valve, also from insufficient guiding of these members in their movements. When the piston and valve are not rigidly connected, the action of the current of incoming steam, particularly when suddenly applied, will often force the valve out of its normal position relatively to the piston, the latter being moved angularly, and when the pressure is suddenly released there is a tendency for the piston and valve to separate, the piston then not fully or properly controlling the regulating-valve. A further objection which is encountered in many appliances of this type is the tendency to leakage at the joint of the controlling-valve chamber with the main body of the casing, this leakage being often sufficient to render the appliance inoperative. In frequent instances the construction is such that only a screw-threaded connection to the cylinder is admissible, and a joint of this character is always found to be more or less objectionable. It being a forced fit, the walls of the cylinder are stretched, so that the plane faces at bottom, which have to be ground in order to insure tightness when in contact, are warped as soon as the metal warms up, although the joint may be apparently tight when cold. The material being strained in position, expansion will so move the parts that if taken apart and cooled they will not fit when replaced, and annoying and expensive delay is involved in repair. The difficulty is aggravated in the case of large valves, and there is also that of insufficient facilities for necessary periodical inspection. In the constructions heretofore employed, so far as my knowledge and information extend, the diaphragm which acts on the controlling-valve has been held in place by the top cap or cover of the casing, and the surface of the diaphragm exposed to fluid-pressure is as large as or larger than the horizontal section of the cylinder and its inclosing wall. Such a construction necessitates a different diameter of diaphragm for each size of pressure-regulator, and consequently a different-sized adjusting-spring to correspond with the difference in pressure due to the variation in diameter of the diaphragm. In small appliances under moderate pressures, as for heating purposes, this manner of connecting the diaphragm has not proven specially objectionable; but in large ones it is absolutely impractical, as under even moderate pressures the limit of capacity of a single spring and of resistance to buckling in the diaphragm is very soon reached. In such cases several springs are usually employed, and sometimes three or more diaphragms are used, according to the range of pressures to be carried, which expedients are seriously detrimental to the sensitiveness and accuracy of the appliance.

My invention is designed to overcome the several objections above indicated as obtaining in prior constructions without involving structural complication or expense or departure from the general operative principles under which effective and reliable practical service may be afforded and assured.

In the practice of my invention I provide a casing or shell 1, having an inlet-passage 2 and an outlet-passage 3. The inlet and outlet passages are either provided with flanges 4 for the connection of pipes, through which the fluid whose pressure is to be regulated is conveyed to and from the casing, or are screw-threaded for that purpose, accordingly as their size and the conditions of service may render desirable. The inlet and outlet passages are separated by a wall or partition 5, extending across the casing and having an opening or passage 6, controlled by a main or regulating valve 7, which is formed integral with or fixed on a stem 8 and seats upon a face on the lower side (being that next the inlet-passage) of the partition 5. The lower end of the regulating-valve stem works in a guide 9, which is open at bottom to the inlet side of the casing to permit the escape of water of condensation and is formed centrally upon or fixed to a bottom cap 10, which closes an opening in the casing, through which the regulating-valve is inserted and removed as required, and is secured to the casing by bolts 11. The bottom cap 10 and its central guide 9 are made as rigid as practicable by radial ribs or brackets 10$^a$, extending from the guide to the wall of the cap. The regulating-valve is subject to the pressure of a spring 12, which bears against its lower side and against a collar on the guide 9 and acts, in conjunction with the inlet-pressure, to seat the valve.

The opening movements of the regulating-valve are effected by a properly-packed piston 13, which is fitted to traverse in a piston chamber or cylinder 14, formed upon the valve-casing 1 and communicating with the outlet side thereof by openings 15. The stem 8 of the regulating-valve passes through a central sleeve or tubular extension 16, formed on the piston 13, the lower end of which sleeve abuts against a collar or shoulder on the valve-stem, and the valve-stem and piston are rigidly connected by a nut 17, engaging a screw-thread on the upper end portion of the valve-stem. The sleeve of the piston and the portion of the valve-stem which fits therein are preferably slightly tapered, and a key 18 may be fitted in the upper portion of the joint between the piston and valve-stem to prevent any relative rotary movement of these members. The sleeve 16 fits freely in and in the movements of the connected piston and valve is guided by an opening 24 in the shell or casing 1 at the bottom of the piston-chamber. The shell is thickened around the opening 24, so as to provide sufficient bearing-surface, and the bearing is made rigid by a plurality of ribs or brackets 24ª. By the above construction an effective rigid connection of the regulating-valve and actuating-piston is provided, and the connected members are properly and sufficiently guided to insure true rectilineal movement both above and below the valve. The joint between the valve-stem and piston-sleeve is not subject to distortion by the action of fluid-pressure, but will keep smooth and true. The valve and piston form a positive moving member the elements of which may be readily disconnected when necessary, and the regulating-valve being kept truly concentric with its seat wear and necessity of regrinding are correspondingly reduced.

The upper end of the piston-chamber 14 is closed by a controlling-valve chamber 20, which fits truly in a counterbore or enlargement of the piston-chamber at and adjoining its upper end and is held firmly in position, with the capacity of ready removal when desired, by a top cap 21, within which the upper side of the controlling-valve chamber fits and which is secured to the piston-chamber by bolts 22, passing through holes in a top flange 23 on said chamber. In order to overcome the tendency to deformation of the piston-chamber hereinbefore referred to, a plurality of radial ribs 19 is formed on the periphery of said chamber, said ribs extending outwardly therefrom and terminating on the shell or casing 1 and on the upper flange 23.

While a construction in which the piston-chamber is formed integral with the main shell or casing is advantageous and desirable as to cost of manufacture, in some instances it may be preferable to employ a piston-chamber which is made separate from and connected to the main casing. Thus, for example, the separate piston-chamber may be made of brass in order to avoid oxidation and the main casing be made of a cheaper material to economize cost. Fig. 15 illustrates a construction in which the piston-chamber 14, which in other particulars is similar to that before described, is made separate from the main shell or casing 1 and is connected thereto by studs 14ª, passing through a flange on the bottom of the piston-chamber and entering a corresponding face on the shell or casing. The ribbed bottom of the piston-chamber is shouldered and fits truly in a corresponding opening in the shell or casing 1.

The space between the top of the controlling-valve chamber 20 and the top cap 21 constitutes a pressure-chamber 25, the upper central portion of which is closed by a flexible diaphragm 26, which is fitted in a central opening in the top cap 21 of substantially smaller diameter than the piston-chamber and which is secured peripherally between a shouldered face surrounding the opening and a diaphragm-holder 27, which is provided with an external screw-thread engaging a corresponding internal thread in the opening of the top cap 21. The diaphragm-holder is provided with a central sleeve or tubular body 28, which serves as a receptacle and adjusting-case for the diaphragm-spring 29, and is counterbored or enlarged at its bottom to receive the lower spring-seat 30, which abuts against the outer face of the diaphragm 26. The diaphragm-spring 29 bears against the lower spring-seat 30 and against an upper spring-seat 31, and its tension may be varied and regulated as desired by an adjusting-cap 32, which bears on the upper spring-seat 31 and engages an external thread on the adjusting-case 28. The adjusting-cap is provided with a peripheral flange having a plurality of openings adapted to register with similar openings in a corresponding flange on a lock-nut 33, which engages the thread of the adjusting-case below the adjusting-cap. When the adjusting-cap has been moved into position to impart the desired tension to the spring 29, it is locked therein by the lock-nut 33, and a padlock 34ª or other suitable fastening may be passed through corresponding openings of the flanges of the adjusting-cap and lock-nut to prevent displacement of the parts. It will be seen that under this construction a very much smaller diaphragm and spring may be employed than is practicable in the appliances ordinarily heretofore applied in practice, that variation of the proportions of the diaphragm and spring in regulators of different sizes is rendered unnecessary, and that the diaphragm, spring, and spring-seats may be readily and expeditiously removed and replaced as desired. By the provision of means for closing the port leading into the pressure-chamber, as presently to be described, these operations may be performed without shutting off the flow of fluid to and through the casing of the regulating-valve.

The admission of fluid from the inlet side of the casing 1 to the piston-chamber 14 to effect the downward movement of the piston 13 and the consequent opening movement of the regulating-valve 7 is effected and regulated by a secondary or controlling valve 34, formed upon or fixed to a stem 35 and adapted to move vertically in a central recess 36 in the controlling-valve chamber 20 in line axially with the diaphragm-spring 29. The controlling-valve 34 is normally held to a seat around an opening in the top of the central recess 36 by a spring 37, bearing against the lower side of the valve and against a screw-cap 38, which closes the bottom of the recess 36 and which when detached admits of the removal and insertion of the controlling-valve and spring as required. A port or passage 39 leads through the chamber 20 from the recess 36 to a connection with a port 40, leading along the outside of the piston-chamber into the casing 1 on the inlet side of the regulating-valve 7, and a port 41 leads from the upper opening in the recess 36, which is controlled by the valve 34, into the top of the piston-chamber 14, the valve 34 thus controlling the admission of fluid through the ports 40 and 39, recess 36, and port 41 from the inlet side of the casing 1 to the upper side of the piston 13. The stem 35 of the controlling-valve passes through and fits truly in a central opening in the top of the controlling-valve chamber 20 and abuts against the lower side of the diaphragm 26, by the downward movement of which under pressure from the spring 29 the controlling-valve will consequently be unseated. A lateral port 42 in the top cap 21 leads from the pressure-chamber 25 to a connection with a port 43, leading along the outside of the piston-chamber into the casing 1 on the outlet side of the regulating-valve 7. The port 40 is controlled by a valve 44, which is illustrated as a conical-ended set-screw, although any other known and preferred form of valve may be employed, and the port 43 is controlled by a valve 45, which is similarly illustrated. By closing the ports 40 and 43 by their respective valves the top cap and controlling-valve chamber and their accessories may be removed whenever desired without requiring the stoppage of the flow of fluid through the shell or casing 1 as a preliminary to such removal. In cases of emergency, as where when at sea or otherwise distant from a base of supplies the repair of the controlling-valve chamber or its accessories might require considerable time and a new member or members were not available, the top cap could be replaced and by manipulation of the valve 44 fluid-pressure could be introduced above the top of the piston 13 and temporarily regulated to a certain extent by hand.

Fig. 6 illustrates a structural modification which enables the controlling-valve and its spring to be removed and replaced when desired without removing the controlling-valve chamber 20 from its position in the piston-chamber. The controlling-valve 34 is in this instance made of the same diameter as its stem 35 and is fitted truly in its recess or receptacle 36, which is closed at bottom instead of being provided with a removable cap, as in Fig. 1. An annular groove or recess 46 is formed in the stem at the top of the controlling-valve, said groove establishing communication to a greater or less degree between the ports 39 and 41 accordingly as the valve and stem are depressed, such communication being correspondingly limited or entirely cut off, as the case may be, in and by the upward movement of the valve and stem effected by the spring 37, as permitted by corresponding movement of the diaphragm 26 under increase of pressure in the chamber 25.

For the purpose of automatically opening and closing the port 43, which establishes communication between the pressure-chamber 25 and the outlet side of the casing 1 by the attachment and detachment, respectively, of the top cap 21, the port 43 may, as shown in Fig. 7, be controlled by an automatic check-valve 47, seating upon a face at the bottom of a screw-plug 49, fitting in a recess formed at the top of the port 43 and having a fluted or longitudinally-recessed stem 48, which passes through and projects beyond the top of the plug 49. The stem 48 is of such length as to abut against a stop 59 in the port 42 of the top cap 21 when the latter is brought into contact with the flange 23 for the purpose of being connected thereto. The check-valve 47 is thereby unseated, and communication is established between the ports 42 and 43 through the flutes or grooves of the valve-stem 48. Upon the removal of the top cap 21 the check-valve 47 is seated by a spring 60, which bears on its lower side, and the port 43 is thereby closed, preventing escape of fluid therefrom to the atmosphere when the top cap 21 is taken off. It will be seen that a similarly-operating mechanism may, if desired, be similarly employed in connection with the port 40, which leads to the controlling-valve chamber.

Figs. 9, 10, and 11 illustrate means for simultaneously controlling the ports 43 and 40, so that both of said ports may be wholly or partially opened or closed when and as desired by the operator. The ports 43 and 40 are in this case for convenience located on the same side of the piston-chamber, and the valves 45 and 44, by which they are controlled, are formed on the ends of cylindrical plugs, which are externally threaded and engage corresponding internal threads in the outer walls of the ports. Levers 50 and 51, one of which, as 51, is prolonged to form an operating-handle, are fixed to the outer ends of the valve-plugs 45 and 44 and are coupled one to the other by a link 52. By appropriate and sufficient movements of the handle-lever 51 both the valves may be simultaneously seated, fully opened, or given any degree of partial opening, as desired.

A construction in which an increased degree of movement relatively to that of the diaphragm 26 is imparted to the controlling-valve 34 is shown in Figs. 12, 13, and 14, the same consisting of a system of articulated levers and links interposed between the diaphragm and valve-stem. Referring to Figs. 12 and 13, the diaphragm 26 abuts on its lower side against a plate 53, which rests upon a central bearing 54 on a balance-beam 55. The ends of the balance-beam are coupled by links 56 to levers 57, which are pivoted at their outer ends to bearings 58 on the top of the controlling-valve chamber and bear adjacent to their free ends upon a curved face formed on the top of the stem 35 of the controlling-valve 34. It will be seen that the movement of the diaphragm will be multiplied in its transmission of the valve-stem in accordance with the leverage due to the positions of the lower coupling-pins of the links 56. As shown in Fig. 14, the balance-beam 55 is dispensed with and the links 56 are coupled directly to the diaphragm-plate 53. The controlling-valve of Figs. 12 and 14 is shown as provided with a central relief-passage to prevent the accumulation of water of condensation beneath it, and that of Fig. 6 should be similarly constructed in this particular.

The general features of operation of the appliance are similar to those of others of the same class heretofore known in the art. The piston 13 is moved downwardly to impart opening movement to the regulating-valve 7 by fluid from the inlet side of the casing entering the piston-chamber through the ports 40 and 41, the controlling-valve 34 being unseated by the diaphragm 26 to effect such admission. Upon excess of pressure being exerted in the outlet portion of the casing the diaphragm is raised by pressure of fluid entering through the port 43, the controlling-valve is seated by its spring 37, and the regulating-valve 7 is wholly or partially closed by its spring 12 and the pressure of fluid in the inlet portion of the casing. Upon the seating of the controlling-valve or the throttling of supply to the piston-chamber 14 from the inlet side of the casing the pressure in the piston-chamber above the piston is released by leakage past the piston and by condensation sufficiently to permit of the closure of the regulating-valve 7, either wholly or in part, by the spring and pressure acting upwardly upon it.

A special feature of advantage in practice which is afforded is the capability of readily and promptly effecting repair or renewal of the diaphragm and controlling-valve and their accessories without shutting off the flow of fluid through the casing and without danger of injury to the operator by the escape of fluid. In many instances—as, for example, in the case of regulators installed on vessels of war—this is a matter of great importance.

I claim as my invention and desire to secure by Letters Patent—

1. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve and having an upper flange and a plurality of peripheral ribs, a top cap bolted to the upper flange of the piston-chamber, a piston fitting in said chamber and rigidly connected to the stem of the regulating-valve, a guide fitting a central sleeve on said piston, and located above the regulating-valve, a radially-ribbed bottom cap secured removably to the casing, and a guide fixed to said bottom cap and fitting the stem of the regulating-valve.

2. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve, a piston fitting in said chamber and having a central sleeve or tubular projection, a stem fixed to the regulating-valve and passing through the piston-sleeve, a collar on the valve-stem abutting against the lower end of said sleeve, a nut engaging a thread on the valve-stem and bearing against the opposite side of the piston, a ribbed or bracketed guide fitting the piston-sleeve, a bottom cap secured removably to the casing, and a guide fixed to said bottom cap and fitting the stem of the regulating-valve.

3. In a pressure-regulator, the combination of a shell or casing having inlet and outlet passages separated by a partition, a main or regulating valve controlling a passage in said partition and seating upwardly on a valve-face therein, a piston-chamber on the casing in line axially with the regulating-valve and having a recess or counterbore at its upper end and a surrounding flange, a piston fitting in said chamber and adapted to impart movement to the regulating-valve, a controlling-valve chamber fitting in the recess or counterbore of the piston-chamber, and a top cap abutting against the controlling-valve chamber and the flange of the piston-chamber, and secured by bolts to said flange.

4. In a pressure-regulator, the combination of a shell or casing having inlet and outlet passages separated by a partition, a main or regulating valve controlling a passage in said partition and seating upwardly on a valve-face therein, a piston-chamber on the casing in line axially with the regulating-valve, a piston fitting in said chamber and adapted to impart movement to the regulating-valve, a controlling-valve chamber above the top of the piston-chamber, a secondary or controlling valve working in the controlling-valve chamber and controlling the supply of fluid from the inlet-passage to the piston, a top cap connected to the piston-chamber and having a central opening, a diaphragm and adjusting spring-holder connected removably to the top cap and closing the central opening thereof, a flexible diaphragm secured peripherally between said removable holder and the top cap, and abutting against the stem of the controlling-valve, a spring bearing on said diaphragm, and a port or passage extending through the top cap and establishing communication between the inner face of the diaphragm and the outlet side of the casing.

5. In a pressure-regulator, the combination of a shell or casing having inlet and outlet passages separated by a partition, a main or regulating valve controlling a passage in said partition and seating upwardly on a valve-face therein, a piston-chamber on the casing in line axially with the regulating-valve, a piston fitting in said chamber and adapted to impart movement to the regulating-valve, a controlling-valve chamber above the piston-chamber, a secondary or controlling valve working in the controlling-valve chamber and controlling the supply of fluid from the inlet-passage to the piston, a top cap connected to the piston-chamber and having a central opening, a diaphragm and adjusting spring-holder connected removably to the top cap and closing the central opening thereof, a flexible diaphragm secured peripherally between said removable holder and the top cap, and abutting against the stem of the controlling-valve, a spring located in said removable holder and bearing on said diaphragm, means for adjusting and locking said spring in adjusted position, and a port or passage extending through the top cap and establishing communication between the inner face of the diaphragm and the outlet side of the casing.

6. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve, a piston fitting in said chamber and adapted to impart movement to the regulating-valve, a controlling-valve chamber above the piston-chamber and having a central passage which is open at its outer end, a secondary or controlling valve working in said passage and removable therefrom through its open end, said valve controlling the supply of fluid from the inlet-passage to the piston, a top cap connected to the piston-chamber and having a central opening through which the controlling-valve may be inserted and removed without detaching the top cap, a flexible diaphragm connected to the top cap around the central opening thereof and abutting against the stem of the controlling-valve, a spring bearing on said diaphragm, and a port or passage extending through the top cap and establishing communication between the inner face of the diaphragm and the outlet side of the casing.

7. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve, a piston fitting in said chamber and adapted to impart movement to the regulating-valve, a controlling-valve chamber above the piston-chamber, a secondary or controlling valve working in the controlling-valve chamber and controlling the supply of fluid from the inlet-passage to the piston, a top cap connected to the piston-chamber, a flexible diaphragm connected to said top cap, a spring bearing on said flexible diaphragm, an articulated lever-and-link system interposed between said flexible diaphragm and the stem of the controlling-valve, and a port or passage establishing communication between the inner face of the diaphragm and the outlet side of the casing.

8. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve, a piston fitting in said chamber and adapted to impart movement to the regulating-valve, a controlling-valve chamber above the piston-chamber, a supply side port leading from the inlet side of the casing to the controlling-valve chamber, a secondary or controlling valve working in the controlling-valve chamber and controlling communication between said supply side port and the piston-chamber, a top cap secured to the piston-chamber and forming the outer wall of a pressure-chamber, a flexible diaphragm seated in said cap and adapted to act upon the stem of the controlling-valve, a spring bearing on said diaphragm, a supply side port leading from the outlet side of the casing to the pressure-chamber, and stop-valves controlling the supply side ports of the controlling-valve chamber and pressure-chamber, the closure of said valves permitting the removal of the top cap and controlling-valve chamber and the accessories thereof, cutting off fluid-supply from the casing.

9. In a pressure-regulator, the combination of a shell or casing having inlet and outlet passages separated by a partition, a main or regulating valve controlling a passage in said partition, and seating upwardly on a valve-face therein, a piston-chamber in the casing, in line axially with the regulating-valve, a controlling-valve chamber above the piston-chamber, a supply side port leading from the inlet side of the casing to the controlling-valve chamber, a secondary or controlling valve working in the controlling-valve chamber and controlling communication between said supply side port and the piston-chamber, a top cap secured to the piston-chamber and forming the outer wall of a pressure-chamber, a flexible diaphragm in said pressure-chamber, adapted to act upon the stem of the controlling-valve, a spring bearing on said diaphragm, a supply side port leading from the outlet side of the casing to the pressure-chamber, stop-valves controlling the supply side ports of the controlling-valve chamber and pressure-chamber, and means for simultaneously actuating said stop-valves.

10. In a pressure-regulator, the combination of a shell or casing having inlet and outlet passages separated by a partition, a main or regulating valve controlling a passage in said partition and seating upwardly on a valve-face therein, a piston-chamber on the casing, in line axially with the regulating-valve, a piston fitting in said chamber and adapted to impart movement to the regulating-valve, a controlling-valve chamber above the piston-chamber, a secondary or controlling valve working in the controlling-valve chamber and controlling the supply of fluid from the inlet-passage to the piston, a top cap connected to the piston-chamber and forming the outer wall of a pressure-chamber, a flexible diaphragm in said pressure-chamber, adapted to act upon the stem of the controlling-valve, a spring bearing on said diaphragm, a supply side port leading from the outlet side of the casing to the pressure-chamber, and an automatic check-valve controlling said supply side port.

11. In a pressure-regulator, the combination of the valve-casing, the regulating-valve therein, a controlling-valve chamber seated in the valve-casing, and the cap for said casing abutting against and securing the controlling-valve chamber in place.

JULES P. METZGER.

Witnesses:
 HENRY WHITEHOUSE,
 JOHN F. HOLMES.